United States Patent Office 3,567,374
Patented Mar. 2, 1971

3,567,374
UREA DETERMINATION
Donald R. Wybenga, Alhambra, Calif., assignor to The Dow Chemical Company, Midland, Mich.
No Drawing. Filed July 24, 1968, Ser. No. 747,117
Int. Cl. G01n 21/22, 21/24, 33/16
U.S. Cl. 23—230
10 Claims

ABSTRACT OF THE DISCLOSURE

A reagent for the determination of urea nitrogen in biological fluids using the diacetyl monoxime color reaction is prepared by dissolving thiosemicarbazide, a linearity-enhancing amount of urea and a stabilizing amount of a metal salt, preferably cadmium sulfate, in a mixture of phosphoric acid and sulfuric acid. The reagent has improved linearity, stability, photosensitivity and specificity properties. Methods of preparing the reagent and using it in the determination of urea nitrogen are disclosed.

BACKGROUND OF THE INVENTION

(1) Field of the invention

Numerous reagents have been employed in methods for the determination of urea or urea nitrogen in biological fluids such as serum, plasma, urine or the like. A widely accepted specific method involves incubation of the fluid with urease to bring about enzymatic release of ammonia, which is then determined quantitatively by nesslerization. The urease-nesslerization technique is time-consuming and there is a need for a more rapid method. Several rapid methods have been proposed in which the amount of urea or urea nitrogen in a sample of biological fluid is normally determined by contacting the biological fluid with a reagent which combines with urea in the fluid to form a colored reaction product. The reagent is mixed with the fluid in such a way that the depth or intensity of color produced is proportional to the amount of urea present in the sample of biological fluid. The concentration of urea nitrogen in the sample is then determined by measuring the depth or intensity of color, usually with a colorimeter or a spectrophotometer. By use of conversion charts or comparisons to standard solutions, the measurement of the color produced by the use of the reagent can be converted to give the concentration of urea nitrogen in the sample.

(2) Description of the prior art

Among the methods typical of the prior art determinations is the color reaction with diacetyl monoxime, first described by Fearon, Biochem. J., 33, 902 (1939). Various compounds containing ureide groupings generally give a measurable yellow color with diacetyl monoxime. In the method of Fearon, the sample is treated with diacetyl monoxime in acid solution to form a colored product. The intensity of color produced can then be measured in a colorimeter or spectrophotometer to give a value which is related to the concentration of urea nitrogen in the sample.

The diacetyl monoxime analyses have typically involved two reagents, a first reagent comprising the diacetyl monoxime and a second reagent comprising aqueous acid and other ingredients. Thiosemicarbazide has been employed to intensify the color and change the hue from yellow to red. Coulombe et al., Clinical Chemistry, 9, 102–8 (1963). The reaction has also been further modified by carrying out the diacetyl monoxime urea reaction in weak acid solution containing thiosemicarbazide and ferric ion. Marsh et al., Clinical Chemistry, 11, 624–7 (1965). Methods employing the diacetyl monoxime reaction have also involved a variety of other reagents such as potassium persulfate or N-phenylanthranilic acid. A review of the diacetyl monoxime reaction in urea nitrogen determinations is found in Clinical Chemistry: Principles and Techniques by Henry, pp. 263–264, published by Hoeber Division of Harper and Rowe, New York (second printing, 1964). The prior art diacetyl monoxime reagent and method has not been entirely satisfactory in every respect.

Henry notes a number of disadvantages to the diacetyl monoxime methods for determining urea nitrogen. For example, the color formed in the diacetyl monoxime methods fades rapidly and is photosensitive, the intensity of color changing on exposure to light. The instability of the color necessitates the observance of strict timing in quantitative analytical procedures. The decay of color intensity complicates the procedure to be followed in making determinations on several samples at one time, since the intensity of color can change during the time required for measuring the color produced with a number of samples. Moreover, the color formed in the diacetyl monoxime is not directly proportional to the concentration of urea nitrogen present, that is, the intensity of color is not a linear function of concentration. The degree to which the intensity of color deviates from the linear relationship to concentration is itself dependent on the concentration of urea nitrogen. Consequently, direct measurements of urea nitrogen with the diacetyl monoxime reagent require the use of correction factors which are themselves dependent upon the quantity to be measured. Due to this lack of linearity, quantitative results obtained on biological fluids such as mammalian serum or plasma, for example, are not comparable to the results of determinations employing urease incubation.

It would be desirable that a diacetyl monoxime reagent be specific for urea nitrogen so that other substances present in the sample such as bilirubin will not produce color which interferes with the color developed from the combination of urea nitrogen with the reagent, and so that determinations can be made directly on samples of biological fluids such as serum or plasma without need for deproteinization. It would also be desirable that the reagent and method form a colored product which is stable and which is not sensitive to light, so that measurements of color can be made on several samples in succession without significant loss in accuracy from sample to sample. It would be particularly desirable to provide a simple direct method in which the intensity of color produced with diacetyl monoxime is a substantially linear function of urea nitrogen concentration. It would also be desirable to provide a method and reagent such that the quantitative determinations of urea nitrogen are consistent with those obtained by the methods involving incubation with urease. There is also a need for a reagent and simple method which give quick, accurate and yet inexpensive determinations of urea nitrogen in biological fluids such as serum and plasma.

SUMMARY OF THE INVENTION

This invention is directed to a novel method and reagents for the determination of urea in biological fluids and to methods for preparing and using the same.

It is an object of this invention to provide a stable reagent for use in the determination of urea nitrogen in biological fluids such as serum or plasma or the like which can be prepared well in advance of its use and which remains stable for long periods of time without the use of special storage conditions. Another object of this invention is to provide a method and reagents which produces a specific stable measurable color with urea so that the color measurement can be made without interference by color due to the presence of other substances such as bilirubin and the like and without the need for strict timing of analytical operations. Another object is to provide a method and reagents which will reduce the time required for determining the concentration of urea in a sample. A further object is to provide a method and reagents which produce a stable measurable color with urea, with the intensity of color being a substantially linear function of urea concentration, so that the quantitative results obtained are comparable to those obtained by prior art methods involving incubation of the biological fluid with urease and measurement of the ammonia or carbon dioxide formed. Other objects and advantages of the present invention will be apparent on consideration of the following description and claims.

In the method of the invention, diacetyl monoxime is mixed with a biological fluid in an aqueous strongly acidic medium containing thiosemicarbazide and in the presence of urea and a stabilizing amount of a metal ion selected from cadmium, manganese, zinc and nickel. More particularly, diacetyl monoxime is mixed with a biological fluid such as serum or plasma, an aqueous solution of an analytically-acceptable strong acid having a normality of between about 4 and about 5, thiosemicarbazide, a stabilizing amount of cadmium, manganese, nickel or zinc ion, and, optionally, a linearity-enhancing amount of urea. The term "analytically-acceptable strong acid" is employed herein to mean those organic and inorganic acids having an ionization constant greater than about 0.001 and which are not detrimentally reactive with urea or the reactants employed or with the colored reaction product to be produced. The acid employed can be a strong mineral acid such as sulfuric acid, phosphoric acid or hydrochloric acid or a strong organic acid such as trichloroacetic acid, dichloroacetic acid or mixtures thereof.

Preferred analytically-acceptable strong acids are sulfuric acid and phosphoric acid, and a mixture of sulfuric acid and phosphoric acid containing from about 30 to about 70 moles of sulfuric acid per 100 moles of total acid is particularly preferred. The analytically-acceptable strong acid of choice is a mixture of from about 40 to about 50 moles of sulfuric acid with from about 60 to about 50 moles of phosphoric acid.

The metal ion can be supplied in any convenient form to provide a solution thereof in water. Generally, an acid-soluble salt of cadmium, manganese, nickel or zinc with an analytically-acceptable strong acid is convenient, and the sulfate salts, in particular, cadmium sulfate, are preferred.

In the practice of the invention, the mixing of the biological fluid and the other ingredients results in the formation of a stable colored product with urea by way of the diacetyl monoxime reaction. The additional ingredients of the composition cooperate to facilitate the formation of a stable color which is substantially insensitive to light and which has an intensity which is substantially proportional to the concentration of urea in the biological fluid. The metal ion in particular serves to stabilize the color and the metal ion and the urea both serve to enhance the linear relationship of color intensity to urea concentration.

The intensity of the color formed by the practice of the invention with urea or a biological fluid containing the same is substantially proportional to the amount of urea present. The color can be measured to give an accurate, rapid quantitative measurement of urea, without substantial interference by colors due to the presence of substances such as bilirubin or hemolysis products which may be present in partly hemolyzed serum samples. Moreover, the novel reagent composition for use with the diacetyl monoxime reagent is stable in storage for long periods of time without special storage precautions. Use of the reagent to determine concentrations of urea gives accurate results which are comparable to those obtained with methods employing urease incubation and determination of nitrogen by nesslerization.

In the preparation of the materials for admixture with a biological fluid, it is preferred to employ two separate compositions, a first diacetyl monoxime reagent composition and a second novel improved reagent composition comprising the aqueous acid, the thiosemicarbazide, the metal ion and the urea. When the ingredients are thus prepared as two separate compositions, both such compositions are stable for long periods of time prior to use. The separate compositions can be mixed together with urea or a biological fluid in any order or fashion to produce the color employed in the measurement of urea concentration.

The analytically-acceptable acid, the thiosemicarbazide, the urea, the metal and the diacetyl monoxime are preferably all reagent grade materials.

As in any quantitative procedure employing diacetyl monoxime as the reagent, sufficient diacetyl monoxime must be employed to produce a measurable color with urea and to combine with all the urea present in the ultimate mixture to form the colored product, thus providing an intensity of color proportional to the amount of urea. The ultimate mixture of reagent and biological fluid preferably contains excess diacetyl monoxime. Similarly, the thiosemicarbazide must be employed at an amount sufficient to intensify the color produced. The amount employed should provide a concentration of thiosemicarbazide in the composition which produces a measurable increase in color intensity and a detectable change in color from yellow to red in the diacetyl monoxime color reaction with urea.

In the improved reagent and method of the invention a linearity-enhancing amount of urea is employed. The linearity-enhancing amount of urea forms a given amount of colored product with diacetyl monoxime and the thiosemicarbazide so that the additional color formed with the urea in the biological fluid provides an intensity of color in the ultimate mixture which is much more closely proportional to concentration of urea in the biological fluid than is obtained in the absence of the linearity-enhancing amount of urea in the reagent. Sufficient urea must thus be present in the ultimate reagen composition so that a measurable color is produced by the combination of the reagent urea, the thiosemicarbazide and diacetyl monoxime, even when the composition is not mixed with additional urea. The amount of urea must be sufficient to provide substantial improvement in the linearity of the relationship between color intensity and the concentration of urea in the biological fluid over at least the range of urea concentrations which is normally found in the particular biological fluid under analysis. For example, when the biological fluid is human serum, sufficient urea should be employed to provide a substantially greater degree of linearity of color intensity than is obtained in the absence of reagent urea for serum urea concentrations of from about 5 to about 25 milligrams of urea nitrogen per 100 milliliters of serum. In the present specification and claims, the phrase "linearity-enhancing amount" is employed to designate that concentration of urea in the reagent composition which produces a measurable color with diacetyl monoxime and a substantial improvement in linearity. In particular applications, whether or not the amount of urea employed in the reagent is sufficient to provide an intensity of color proportional to the amount of urea in the sample can be determined by the simple expedient of measuring the intensity of color produced with varying known amounts of added urea in the reagent when samples having known urea concentrations are employed.

The presence of a stabilizing amount of the metal ion in the reagent composition constitutes a further improvement in the use of the diacetyl monoxime reaction in urea determination. Sufficient of the metal ion must be present in the ultimate reagent composition so that the color produced is stable for at least the time required to measure the intensity thereof, and preferably for at least 15 to 30 minutes. The amount of metal ion must also be sufficient to provide a substantially linear relationship between color intensity and the concentration of urea over at least the range of urea concentrations which is normally found in the particular biological fluid under analysis. For example, when the biological fluid is human serum, sufficient metal ion should be employed to provide a substantially linear color intensity for urea concentrations of from about 5 to about 25 milligrams of urea per 100 milliliters of serum.

In the present specification and claims, the phrase "stabilizing amount" is employed to designate that concentration of the metal ion in the composition which produces a color of the required stability. When insufficient metal ion is employed, quantitative results can be obtained, but the use of strict timing of analytical operations and the use of correction factors is required due to the loss of stability and linearity. In particular applications, whether or not the amount of metal ion employed is sufficient to provide an intensity of stable color proportional to the amount of urea can be determined by the simple expedient of measuring the intensity of color produced with varying known amounts of urea and measuring the intensity of color over a period of time.

In general, good results are obtained with a first aqueous composition containing a color-forming amount of diacetyl monoxime at a concentration of from at least about 0.5 percent (weight of diacetyl monoxime by volume of the mixture) to about saturation of the aqueous mixture. Generally, aqueous solutions of diacetyl monoxime at concentrations from about 1 to about 3 percent (weight by volume) are preferred.

The second composition generally comprises an aqueous solution of the analytically-acceptable strong acid, the acid normality being from about 4 to about 5, inclusive, and the thiosemicarbazide, the metal ion and the urea. Best results are obtained when the acid is a mixture of sulfuric and phosphoric acids containing about 40 to 50 mole percent of sufuric acid. The metal ion can be present in amounts from about 0.001 molar to as high as 0.5 molar or saturation of the mixture, however, the concentration is preferably from 0.005 to 0.05 molar. The added reagent urea can be in amounts from as low as 0.1 milligram per liter to as high as desired so long as the combination of reagent urea plus the urea in the biological fluid is less than the amount which will exhaust the diacetyl monoxime reagent in the ultimate mixture. Good results are obtained when the concentration of the metal ion is from about 0.001 to about 0.025 molar, the concentration of thiosemicarbazide is from about 0.001 to 0.025 percent (weight of thiosemicarbazide by volume of aqueous acid mixture), and the concentration of urea is from about 0.1 to 0.6 milligram per liter of aqueous acid mixture.

In the quantitative determination of urea by the method of the invention, the first and second reagent compositions are mixed with a sample, generally a biological fluid or a urea-containing substance such as a standard solution. In quantitative operations, the reagents are mixed with a minor amount of a biological fluid containing urea. The biological fluid can be an extract, as from a tissue homogenate or the like, or it can be an animal body fluid such as blood, plasma, serum, urine, lymphatic fluid, bile, cerebrospinal fluids or the like. The biological fluid can be employed directly as a sample or it can be treated by conventional procedures such as dilution, deproteinization, concentration, filtration, centrifugation, extraction or the like. The second reagent is mixed thoroughly with a minor proportion of the sample and a minor proportion of the diacetyl monoxime composition, conveniently in the proportions of about one part by volume of sample to from about 10 to about 50 parts of the first diacetyl monoxime composition and from about 50 to about 300 parts by volume of the second reagent. The reagents and sample can be mixed in receptacles of a particular predetermined optical density or absorbance such as the tubes and cuvets conventionally employed with colorimeters or spectrophotometers, if desired. The reagents and the urea in the sample combine at elevated temperatures to form a stable colored product with an intensity of color proportional to the amount of urea. Accordingly, for rapid quantitative results, the mixture should be heated to a temperature of from about 85° to about 115° C. within about five to fifteen minutes after mixing. The mixture should then be cooled to a temperature below the stated range. The exact temperature and time for heating are not critical when only qualitative determinations are desired. However, the quantitative accuracy of the method of the invention is greatly enhanced by controlling the heating time and temperature.

Substantial over-heating of the mixture can partially destroy the colored product and impair the accuracy of quantitative results. Thus, for exact quantitative procedures, the mixture can be heated to a given temperature between about 85° and about 115° C. in from about one to five minutes after heating is begun, held at such temperature for a controlled period of time and then cooled to a temperature below the above-stated temperature range within about three to about five minutes after heating has ceased.

The heating step can be conveniently carried out by placing tubes containing the mixture of reagents and sample in a conventional tube heating block at a temperature of 100° C. for from ten to fourteen minutes. In a convenient procedure for cooling the mixture, the tubes are removed from the heating block and immersed in a cold water bath for from three to five minutes. Other conventional means for heating and cooling the tubes can be employed such as hot water or oil baths, ice baths and the like.

The color of the mixture can be measured by any means which will give an accurate measurement of the intensity of color. Preferably, a spectrophotometer or a colorimeter is employed. When the method is carried out in a colorimeter tube or spectrophotometer cuvet, the mixture can then be placed in the instrument and its absorbance or transmittance determined. Otherwise, an aliquot portion of the mixture can be placed in such a tube or cuvet and the intensity of color is determined on a colorimeter or spectrophotometer. In such operations, it is preferred to determine the absorbance or percent transmittance of the mixture with light having a wave-length between about 495 millimicrons and 600 millimicrons. The amount of urea present in the sample can then be determined by a comparison of the percent transmittance or absorbance observed for the sample with the measurements obtained when samples containing known amounts of urea are employed, or with conversion charts or tables prepared from such data.

In making the colorimeter or spectrophotometer determinations, it is desirable to employ the readings obtained on the reagent mixture alone and in the absence of any urea from a sample and to thus measure the difference in absorbance (optical density) or percent transmittance between the sample and the pure reagent (reagent blank). Such procedure minimizes the effect of deviations in the amount of the urea reagent employed in successive determinations. Reagent blank determinations are not generally necessary for successive determinations, so long as the diacetyl monoxime reagent and the second reagent composition are the same as those employed for the original reagent blank determination. The reagent compositions will give reagent blank values which do not deviate significantly from the original values, even after storage period of nine months under refrigeration.

It is also desirable to employ a urea standard when employing the procedure of the invention to determine the amount of urea present in a sample of biological fluid. In this procedure, a standard sample is prepared to contain a known amount of urea and this sample is mixed with the reagents in the same predetermined proportions and treated in the identical procedure as the sample of biological fluid containing an unknown amount of urea. The simultaneous use of a urea standard substantially eliminates the effect of procedural deviations. The employment of the standard also permits the calculation of urea concentration in the sample of biological fluid by comparison of the readings obtained with the standard and the sample.

In a convenient procedure, each sample or group of samples to be analyzed, a urea standard sample and a reagent blank composition are treated simultaneously. Additional biological fluid sample tubes can be prepared, so long as all tubes can be heated and cooled at the same temperatures simultaneously. The intensity of color for the urea standard and the sample tubes is then measured, taking account of the reagent blank, and the concentration of urea in the sample is obtained by comparing the intensity of color in the sample tube with the intensity of color produced by the known concentration of urea in the urea standard.

DESCRIPTION OF THE PREFERRED EMBODIMENTS

The following examples illustrate the present invention but are not to be construed as limiting the same.

EXAMPLE 1

A reagent composition is prepared by the following procedure, 427 milliliters of concentrated sulfuric acid are dissolved in 2000 milliliters of water and the solution is stirred and cooled in an ice bath. This mixture is cooled in an ice bath while 660 milliliters of 85 percent aqueous phosphoric acid are added portionwise to the mixture, the mixture being thoroughly mixed after the addition of each portion. The solution is cooled in the ice bath to a temperature of 20° C. and then diluted by the addition of 6000 milliliters of water. 450 milligrams of thiosemicarbazide, 2.6 milligrams of urea and 21.0 grams of cadmium sulfate are added to the mixture and dissolved therein. The mixture is then diluted with water to a total volume of 10,000 milliliters and filtered to provide a reagent composition.

In substantially the same procedure, reagent compositions are prepared in which one of zinc sulfate, nickel dichloride, or manganese sulfate is substituted for the cadmium sulfate. The reagent compositions are employed in determination of urea with the diacetyl monoxime reaction.

EXAMPLE 2

Twenty grams of diacetyl monoxime are dissolved in one liter of water to prepare a diacetyl monoxime reagent composition. 0.5 milliliter of this composition and 5.0 milliliters of the cadmium-containing reagent of Example 1 are mixed together in each of three colorimeter tubes, A, B and C. 0.020 milliliter of human serum containing an unknown amount of urea is added to tube A. 0.02 milliliter of a solution containing 20 milligrams of urea nitrogen per 100 milliliters of water is added to tube B to provide a urea standard. No serum or urea solution is added to tube C and tube C is employed as a reagent blank. The mixtures in all three tubes are mixed thoroughly by shaking ten times (about 5 seconds). All three tubes are then simultaneously placed in a heating block set at 100° C. and heated for twelve minutes, at which time the temperature in each tube is approximately 100° C. The tubes are then removed simultaneously and immersed in a cold water bath for five minutes, during which time the temperature of the contents of each tube is lowered to about 25° C. The tubes are then removed from the water, dried and the contents of each tube are mixed by inverting the tube a few times. The tubes are placed in a colorimeter with a filter for light having a wave length of 540 millimicrons. The indicating device on the colorimeter has been previously set to read zero absorbance for distilled water. The absorbances of tubes A, B and C are then read on the colorimeter and recorded. The concentration of urea in the sample in milligrams of urea nitrogen per 100 milliliters of sample is calculated by multiplying the difference between the absorbance of the sample (A) and that of the reagent blank (C) by 20 and dividing the product by the difference between the absorbance of the urea standard (B) and that of the reagent blank (C). The results obtained are in excellent agreement with the results obtained by determination of urea nitrogen on an identical serum sample by urease incubation followed by nesslerization.

EXAMPLE 3

The reagent compositions employed above are held in the refrigerator at a temperature of about 3° C. for 6 months. At periodic intervals reagent blanks are prepared, comprising 0.5 milliliter of the diacetyl monoxime reagent and 5 milliliters of the cadmium-containing reagent of Example 1. The reagent blanks are heated and cooled as set out in Example 2. Throughout the test period the absorbance of the reagent blanks obtained from the aged reagent are not found to differ significantly from the absorbance originally observed with the freshly-prepared composition.

EXAMPLE 4

Twenty samples of serum are collected and each portion is divided into two identical portions to provide two separate series, I and II, of serum samples, each of which contains an unknown concentration of urea. The serum samples of series I are analyzed for urea nitrogen by incubation with urease followed by nesesslerization. The corresponding samples of series II are analyzed by the following procedure.

Twenty grams of diacetyl monoxime are dissolved in one liter of water to prepare a diacetyl monoxime reagent composition. 0.5 milliliters of this composition and 5.0 milliliters of the cadmium-containing reagent of Example 1 are mixed together in each of three colorimeter tubes, A, B and C. 0.020 milliliter of human serum containing an unknown amount of urea is added to tube A. 0.02 milliliter of a solution containing 20 milligrams of urea nitrogen per 100 milliliters of water is added to tube B to provide a urea standard. No serum or urea solution is added to tube C and tube C is employed as a reagent blank. The mixtures in all three tubes are mixed thoroughly by shaking ten times (about 5 seconds). All three tubes are then simultaneously placed in a heating block set at 100° C. and heated for twelve minutes, at which time the temperature in each tube is approximately 100° C. The tubes are then removed simultaneously and immersed in a cold water bath for five minutes. The tubes are then removed from the water, dried and the contents of each tube are mixed by inverting the tube a few times. The contents of the tubes are then placed separately in spectrophotometer cuvets, and the intensity of the color in each composition is measured on a spectrophotometer employing light of a wave length of 540 millimicrons. The indicating device on the spectrophotometer has been previously set to read zero absorbance for distilled water. The absorbances of the compositions from tubes A, B and C are then read on the spectrophotometer and recorded. The concentration of urea in the sample milligrams of urea nitrogen per 100 milliliters of sample is calculated by multiplying the difference between the absorbance of the sample (A) and that of the reagent blank (C) by 20 and dividing the product by the difference between the absorbance of the urea standard (B) and that of the reagent blank (C).

Excellent agreement is observed between the results obtained in series II with the method and composition of the invention and the results obtained in series I by urease incubation and nesslerization.

EXAMPLE 5

The precision of the determination of urea with method and reagent of Examples 2 and 3 from one determination to the other is evaluated. The evaluations are carried out by making determinations on samples containing different levels of between 10 and 80 milligrams of urea per 100 milliliters of sample. In these operations, thirty consecutive determinations are carried out on each sample. Statistical treatment of the data indicates excellent precision of the method from one determination to another.

EXAMPLE 6

In other determinations, the reagent and method of Example 4 are employed to compare samples of human serum containing known amounts of urea with samples containing the same amount of urea to which bilirubin has been added in known amounts. No significant difference in intensity of color is observed between the serum samples and the samples containing added bilirubin. These determinations indicate that no interference by bilirubin is observed at concentrations of 10 milligrams of bilirubin per 100 milliliters of sample.

I claim:

1. In a reagent composition useful in conjunction with diacetyl monoxime in the determination of urea in biological fluids, the composition comprising thiosemicarbazide in an aqueous analytically-acceptable strong acid selected from the group consisting of sulfuric acid, phosphoric acid, hydrochloric acid, trichloroacetic acid, dichloroacetic acid and mixtures thereof, the improvement which comprises, as additional ingredients in such composition, a stabilizing amount of a metal ion selected from the group consisting of cadmium, nickel, and zinc, said metal ion being present in an amount of from about 0.001 molar to saturation of the composition; and a linearity-enhancing amount of from about 0.1 to about 0.6 milligram of urea per liter of said composition.

2. The composition of claim 1 wherein the metal ion is cadmium ion.

3. The composition of claim 1 wherein the analytically strong acid is a mixture of sulfuric acid and phosphoric acid containing from about 40 to about 50 mole percent of sulfuric acid.

4. The composition of claim 1 wherein the metal ion is cadmium ion and is present in a concentration of from about 0.001 to about 0.025 molar and wherein the concentration of urea is from about 0.1 to about 0.6 milligram per liter of composition.

5. The method of claim 4 wherein the biological fluid is selected from the group consisting of serum and plasma, and wherein the mixing step is carried out by mixing a minor amount of the biological fluid directly with the diacetyl monoxime, thiosemicarbazide, acid, metal ion and urea.

6. The method of claim 5 wherein the biological fluid is serum.

7. The method of claim 5 wherein the biological fluid contains an unknown amount of between 10 and 80 milligrams of urea per 100 milliliters.

8. The method of claim 7 wherein the urea is added in an amount of about 0.26 milligram of urea per liter of aqueous acid solution.

9. In a method for the determination of urea nitrogen in biological fluids which comprises mixing a biological fluid with diacetyl monoxime, thiosemicarbazide and an aqueous solution of an analytically-acceptable strong acid selected from the group consisting of sulfuric acid, phosphoric acid, hydrochloric acid, trichloroacetic acid, dichloroacetic acid and mixtures thereof, and heating the resulting mixture, the improvement which comprises the steps of adding a stabilizing amount of from about 0.001 molar to saturation of the aqueous acid solution of a metal ion to the mixture prior to the heating step, the metal ion being selected from the group consisting of cadmium, nickel and zinc and adding from about 0.1 to about 0.6 milligram of urea per liter of aqueous acid solution to the mixture prior to the heating step.

10. The method of claim 9 wherein the metal ion is cadmium.

References Cited

Coulombe et al., Clinical Chemistry, vol. 9, pp. 102–8 (1963).

Friedman, H. S., Analytical Chemistry, vol. 25, pp. 662–4 (1953).

Beale, R. N. et al., Chemical Abstracts, vol. 56, p. 657 (1962).

Yamaga, H., Chemical Abstracts, vol. 63, p. 13687 (1965).

MORRIS O. WOLK, Primary Examiner

E. A. KATZ, Assistant Examiner

U.S. Cl. X.R.

252—408